(12) United States Patent
Itami

(10) Patent No.: US 8,582,165 B2
(45) Date of Patent: Nov. 12, 2013

(54) DOCUMENT PROCESSING APPARATUS

(75) Inventor: Tsuyoshi Itami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 12/703,682

(22) Filed: Feb. 10, 2010

(65) Prior Publication Data

US 2010/0208303 A1    Aug. 19, 2010

(30) Foreign Application Priority Data

Feb. 17, 2009  (JP) .................................. 2009-034241

(51) Int. Cl.
*G06F 17/24* (2006.01)

(52) U.S. Cl.
USPC ......................................... 358/1.18; 715/277

(58) Field of Classification Search
None
See application file for complete search history.

(56) References Cited

U.S. PATENT DOCUMENTS

| | | | | |
|---|---|---|---|---|
| 5,675,672 | A | * | 10/1997 | Nakabayashi ................ 382/318 |
| 5,920,685 | A | * | 7/1999 | Romano et al. .............. 358/1.15 |
| 2007/0103704 | A1 | * | 5/2007 | Chou et al. .................... 358/1.9 |

FOREIGN PATENT DOCUMENTS

| | | | |
|---|---|---|---|
| JP | 2000-215010 A | | 8/2000 |
| JP | 2003259110 A | * | 9/2003 |

* cited by examiner

*Primary Examiner* — Twyler Haskins
*Assistant Examiner* — Lennin Rodriguez Gonzalez
(74) *Attorney, Agent, or Firm* — Canon USA Inc. IP Division

(57) ABSTRACT

A document processing apparatus includes: a unit configured to detect a leading-edge point of an object in a page; a unit configured to calculate an association of objects to determine whether they should be merged into one based on the area matching rate between the leading-edge points of the objects; a unit configured not only to slide the objects in a normally appropriate direction for merging but also to perform fine-tuning in the vicinity thereof so as to derive a maximum area matching rate and improve the completeness of finished form of merging; a unit configured to merge the mating leading edges of the objects and further merge sets of overlapping objects; a unit configured to calculate the association by comparing attribute values included in the objects instead of using the area matching rate between the mating leading-edge points thereof, depending on a kind of the objects; and a unit configured to reduce the merged objects so that they fit into one page.

7 Claims, 24 Drawing Sheets

AREA MATCHING RATE

1001
AN OBJECT ON REAR
PAGE FITS INTO
ITS UPPER HALF

1002
AN OBJECT ON
REAR PAGE FITS INTO
ITS LEFT HALF

LEADING-EDGE POINTS
NOT OVERLAPPING

LEADING-EDGE POINTS GENERATED
AT CONTROL POINTS SINCE
OVERLAPPING IS ASSUMED

DOCUMENT PROCESSING APPARATUS

BACKGROUND OF THE INVENTION

1. Field of the Invention

The present invention relates to a document processing apparatus and a document processing method and particularly to a document processing apparatus and a document processing method for merging objects split over pages.

2. Description of the Related Art

With recent growing demands for the efficiency for all resources, a technique for reducing the number of printed sheets is also demanded in the field of printing. Techniques currently being developed include a technique for advancing N-up printing and a technique for reducing the number of printed sheets by way of print saving to remove a space between objects.

In the print saving, a satisfactory completeness of finished form may not be obtained simply by removing a space between objects. For example, when printing a piece of spreadsheet application data having no page concept through a printer driver, an object may be arranged over a plurality of pages although it should be printed as one table, as illustrated in FIG. 1.

When a phenomenon as illustrated in FIG. 1 occurs, an object running off to another page consumes one page although the amount of such piece of object is very small. When print saving is simply performed, although the entire data may fit into one page by reducing the size of each piece of object and removing a space between pieces of the object, the original data form is not likely to be restored, which degrades readability.

Further, once application data is converted to other formats, attribute information denoting that the data is one object may disappear and only drawing information remains.

There is a primitive method for rebuilding application data of a document so that objects once split over pages may fit into one page, and then converting the data to other formats. However, rebuilding the application data is very time-consuming. Further, it is conceivable that after application data of a document is converted to another format and delivered in a document system, the application data of the document is lost and cannot be rebuild.

In recent years, a technique for merging transmitted split objects into one in a comparatively large system has been discussed (for example, in Japanese Patent Application Laid-Open No. 2000-215010).

The above-mentioned technique merges as one object the image data once split into a set of a plurality of objects while the image data is originally represented as one object on one page. This means that the technique is not applicable to merging objects split over pages. More specifically, the technique is applicable only to merging a plurality of fragmental objects arranged without a space therebetween, into one. Therefore, the technique has a problem that it cannot re-merge objects split over pages into one.

SUMMARY OF THE INVENTION

The present invention is directed to re-merging the objects split over pages.

According to an aspect of the present invention, the document processing apparatus includes: an extraction unit configured to extract a leading edge of a first object at an end of a first page, and a leading edge of a second object at an end on the side facing the first page end, on a second page following the first page; a merging unit configured to merge, when a result of overlapping the leading edge of the first object with the leading edge of the second object satisfies a certain condition, the leading edge of the first object with the leading edge of the second object; and a reduction unit configured to reduce the objects merged by the merging unit so that they fit into one page.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a flow chart illustrating object merging processing and FIGS. 8A to 8C are supplementary diagrams for the flow chart.

FIGS. 17A to 17C are supplementary diagrams for the flow chart.

DESCRIPTION OF THE EMBODIMENTS

Various exemplary embodiments, features, and aspects of the invention will be described in detail below with reference to the drawings.

Figure 2:
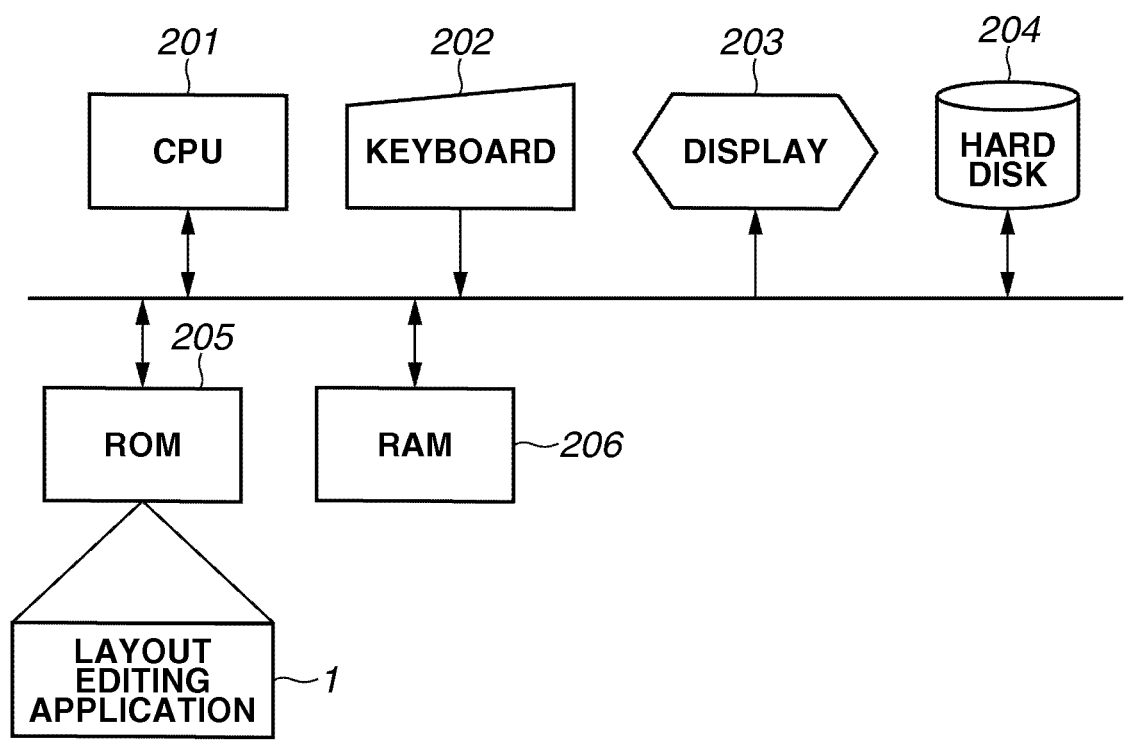
FIG. 2 illustrates an exemplary hardware configuration of a document processing apparatus.

FIG. 2 illustrates an exemplary hardware configuration of a document processing apparatus according to the present exemplary embodiment.

The document processing apparatus includes: a central processing unit (CPU) 201 for operation control; a keyboard 202 for inputting data and commands; a display 203 for displaying an electronic document image; a hard disk 204 for storing electronic documents, for example, a layout editing program which executes processing in the document processing apparatus; a read only memory (ROM) 205 for storing a program which controls the document processing apparatus, and necessary information; and a random access memory (RAM) 206 used as a work area in various ways. The keyboard 202 is an exemplary command input unit for inputting various data and commands. The display 203 is an exemplary display unit for displaying various pieces of information. The hard disk 204 is an exemplary external storage unit for storing various data. The ROM 205 is an exemplary storage unit configured to store various data. The RAM 206 is an exemplary storage unit for temporarily storing various data.

The ROM 205 includes a layout editing application 1. The present exemplary embodiment is realized when the CPU 201 executes the layout editing application 1. In other words, a computer program which executes processing related to the document processing apparatus can cause the computer to operate as the document processing apparatus. A computer-readable storage medium for storing the computer program is not limited to the ROM 205, but may also be a hard disk 204.

Figure 3:
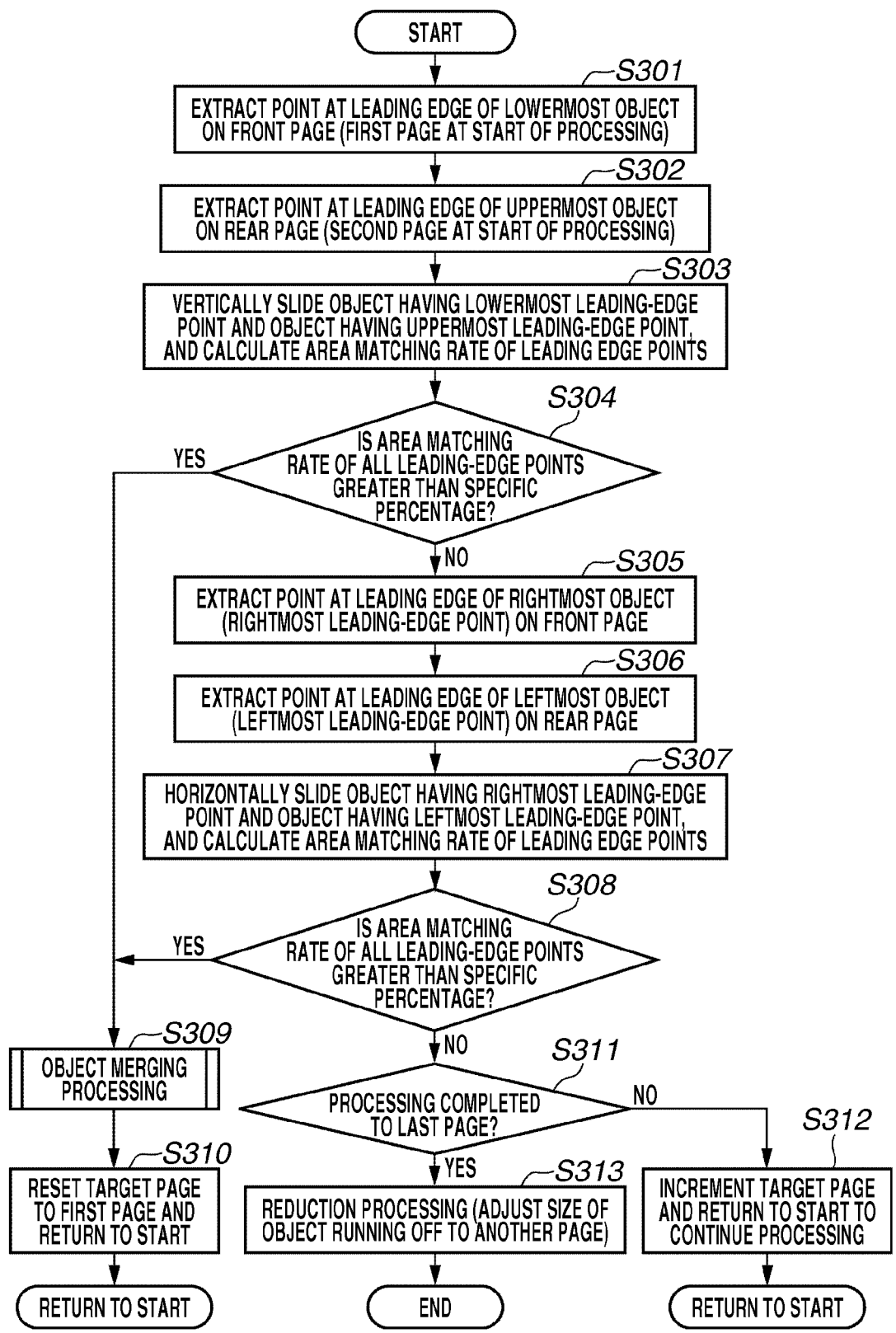
FIG. 3 is a flow chart illustrating processing performed by the document processing apparatus.

FIG. 3 is a flow chart illustrating exemplary document processing related to the document processing apparatus, and FIGS. 3A to 3E are supplementary diagrams for the flow chart. The layout editing application 1 performs processing of the document processing apparatus sequentially from the starting page (first page) through the last page included in an electronic document. The document processing apparatus prepares a pair of pages. The first and last pages of the pair are referred to as front and rear pages, respectively. The layout editing application 1 may determine whether or not to perform the processing for merging objects described below based on the amount of objects which are arranged on the rear page. For example, when an object arranged on the rear page does not occupy a half of the page, the layout editing application 1 determines to perform the processing for merging objects.

Figure 3A:
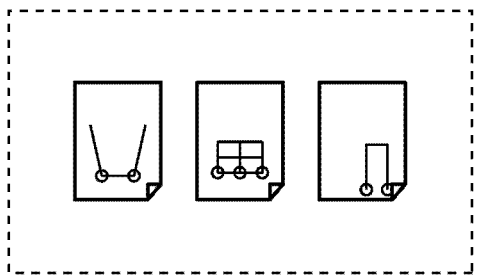
FIGS. 3A to 3E are supplementary diagrams for the flow chart.

In step S301, the layout editing application 1 first analyzes the inside of the front page and then extracts a leading edge of the lowermost object on the page as a leading-edge point. As illustrated in FIG. 3A, the layout editing application 1 extracts a leading edge having the lowermost coordinate position on an inclined graphic line, as a lowermost leading-edge point. When there is a plurality of leading edges having the lowermost coordinate position, the layout editing application 1 extracts the plurality of lowermost leading-edge points.

A leading edge of an object refers to a portion of the object existing within a fixed distance from the lowermost, uppermost, rightmost, or leftmost coordinate position on graphic lines of the object. The present exemplary embodiment provides a leading-edge point at a position which includes a whole or part of a leading edge of the object. More specifically, the concept of the leading edge of the object includes a leading-edge point. The layout editing application 1 extracts a leading edge of the object as a leading-edge point. On the graphic lines of the object, a point at the lowermost end is referred to as lowermost leading-edge point, and a point at the uppermost end is referred to as uppermost leading-edge point. Further, a point at the rightmost end is referred to as right leading-edge point, and a point at the leftmost end is referred to as left leading-edge point.

Figure 4:
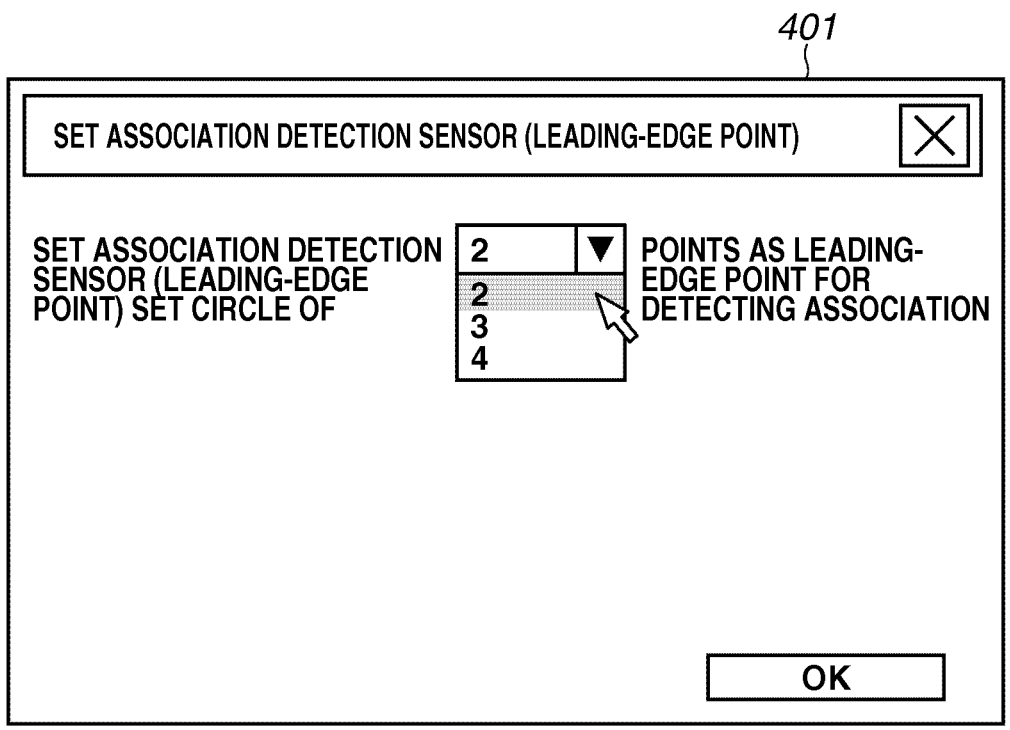
FIG. 4 illustrates an exemplary user interface for inputting a condition.

Further, since any desired shape and size can be employed for leading-edge points, it is preferable to employ specifications which allow the shape and size of leading-edge points to be customized. As illustrated in FIG. 4, the present exemplary embodiment provides a user interface 401 having a list format to allow a user to select the size of leading-edge points. It is also possible to allow the user to select a fixed distance in a similar way.

Further, an inclined graphic line refers to a non-horizontal graphic line when extracting a lowermost leading-edge point and an uppermost leading-edge point, or a non-vertical graphic line when extracting a right leading-edge point and a left leading-edge point. More specifically, the layout editing application 1 extracts a leading edge on a graphic line not perpendicular to the direction in which objects are merged, as leading-edge point.

Figure 5:
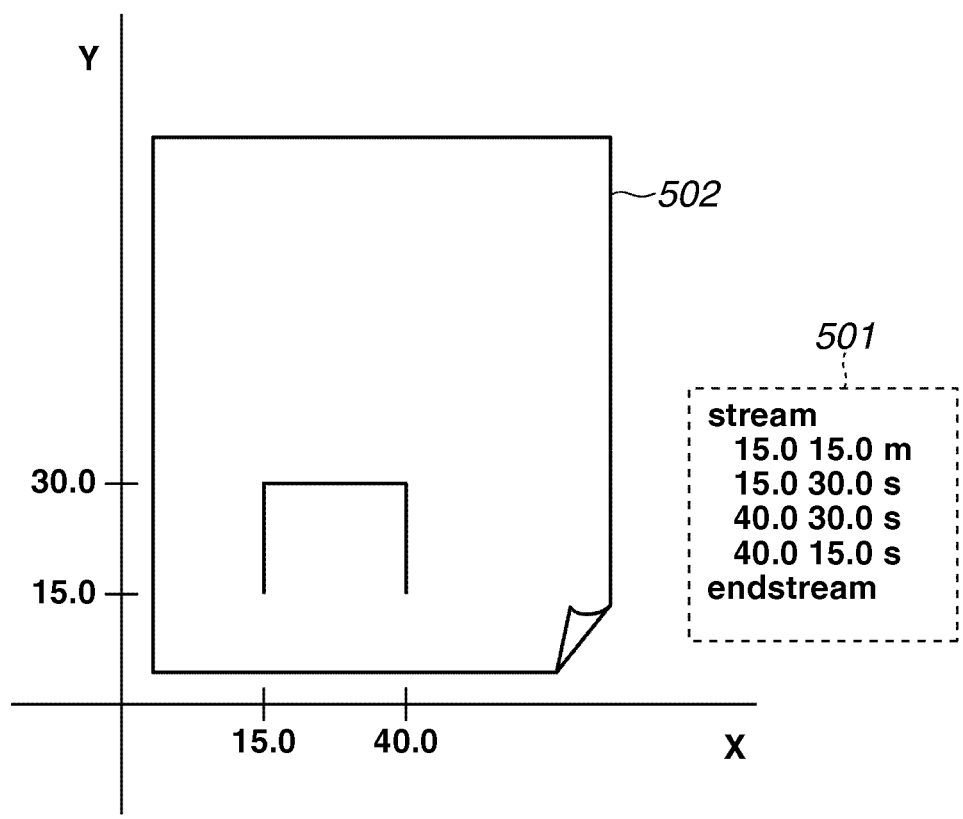
FIG. 5 illustrates exemplary graphic strokes.

An exemplary configuration for extracting a leading-edge point will be described below with reference to FIG. 5. FIG. 5 illustrates exemplary graphic strokes drawn based on the PDF (registered trademark) specification. The PDF is an abbreviation for Portable Document Format. Information about character decoration (color, line width, etc.) for drawing a stroke is omitted.

When the PDF includes a description 501 which instructs calculation procedures, the starting point of a stroke is (X,Y)=(15.0,15.0). A first stroke is drawn from the starting point to a first point (X,Y)=(15.0,30.0). Then, a second stroke is drawn from the first point to a second point (X,Y)=(40.0 30.0). Finally, a third stroke is drawn from the second point to an ending point (X,Y)=(40.0 15.0). This completes processing based on the description 501 which instructs calculation procedures. Then, the drawn strokes are represented on a page 502.

The processing is represented with coordinates in this way. The layout editing application 1 analyzes the processing to extract, for example, a lowermost leading edge on a page as a leading-edge point.

Figure 3B:
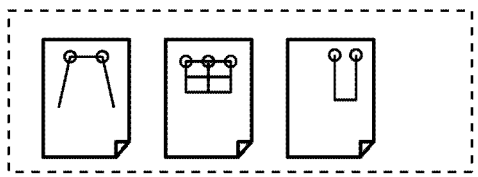

In step S302, the layout editing application 1 extracts a leading edge of an uppermost object on a page (rear page) next to the front page processed in step S301, as a leading-edge point. As illustrated in FIG. 3B (a supplementary diagram for the flow chart), the layout editing application 1 extracts a leading edge having the uppermost coordinate position on inclined graphic lines as a uppermost leading-edge point. When there is a plurality of leading edges having the uppermost coordinate position, the layout editing application 1 extracts the plurality of uppermost leading-edge points.

Figure 3C:
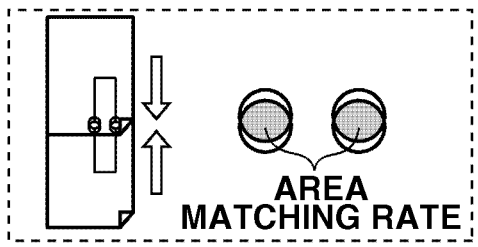
Figure 3D:
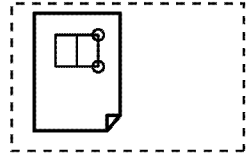
Figure 3E:
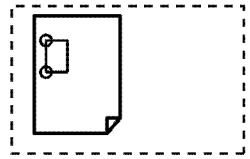
Figure 8:
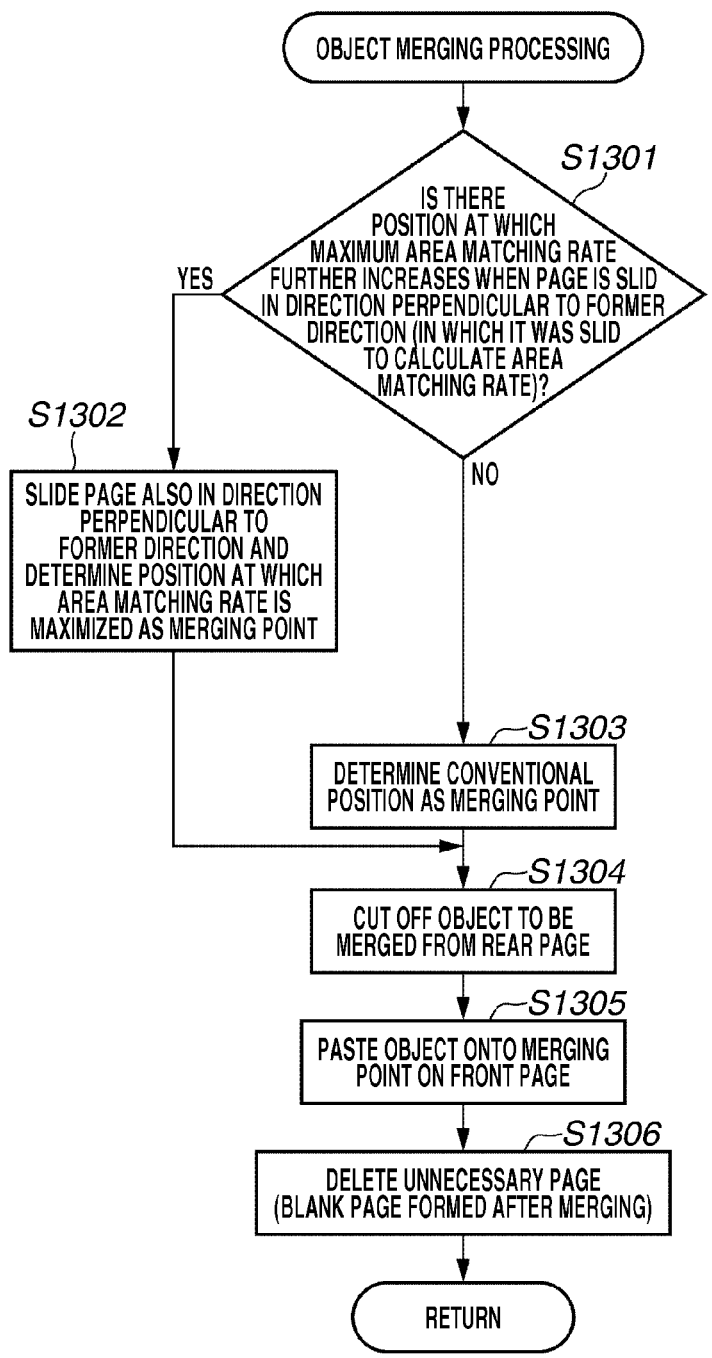

In step S303, the layout editing application 1 vertically slides the page processed in step S301 and the page processed in step S302, as illustrated in FIG. 3C (a supplementary diagram for the flow chart), to calculate the area matching rate. For example, at least one of the front and rear pages can be vertically slid by sliding the pages only in the Y-axis direction with a fixed X-axis coordinate. With the present exemplary embodiment, the area matching rate equals a percentage at which an overlapping area of leading-edge points is maximized as a result of sliding mating leading-edge points in the processing of step S303 or S307. The maximum area matching rate is adjusted as illustrated in FIG. 8. Further, when a plurality of leading-edge points are extracted, the maximum area matching rate equals a percentage at which the sum of overlapping areas of leading-edge points is maximized.

Figure 6:
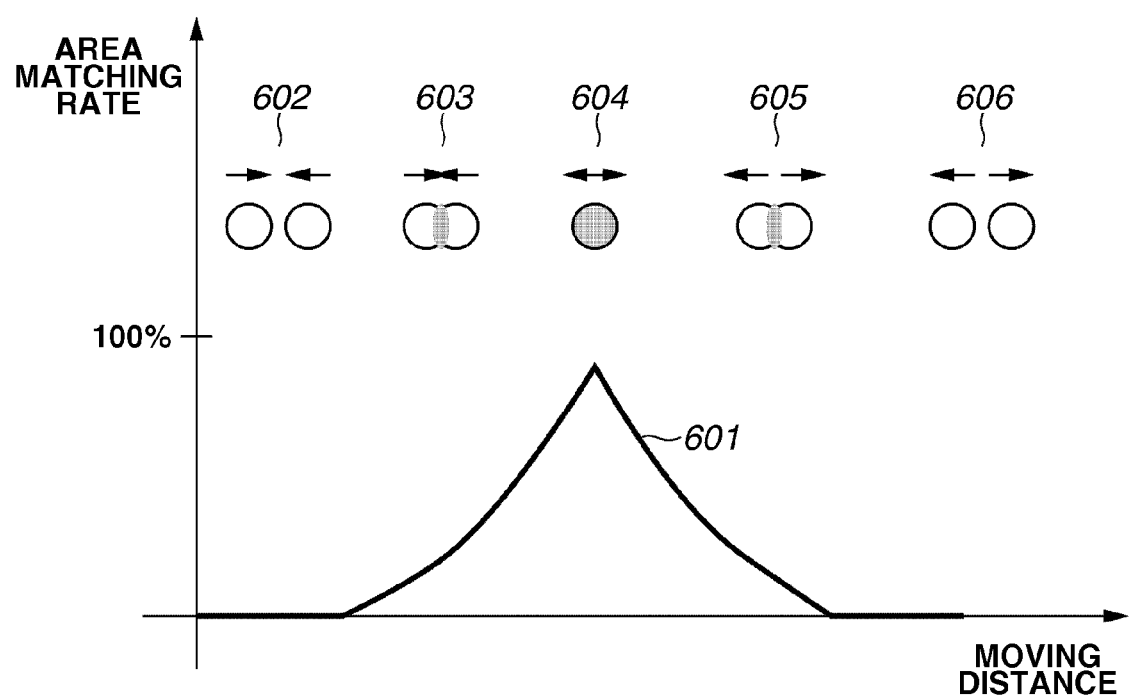
FIG. 6 illustrates an exemplary result of area matching rate analysis.

An exemplary method for determining the maximum area matching rate used by the layout editing application 1 will be described below with reference to FIG. 6. FIG. 6 illustrates an exemplary method for determining the maximum area matching rate when a leading-edge point has a circular shape and each of the front and rear pages includes one leading-edge point. A relation between the distance over which the leading-edge points are slid and the area matching rate is represented by a curve 601.

First of all, at a position 602 at which the leading-edge points are slightly slid from the initial position, the mating leading-edge points have not yet overlapped and therefore the area matching rate is 0%. At a position 603 at which the leading-edge points are further slid, the mating leading-edge points have overlapped. More specifically, at this position, the leading-edge points begin to overlap and accordingly the area matching rate begins to increase. When the leading-edge points are further slid, the overlapping area increases which finally reaches 100% at a certain position (position 604).

Then, if the mating leading-edge points are further slid, the overlapping area decreases at a point. Accordingly, if the mating leading-edge points are still further slid, the mating leading-edge points do not overlap with each other and the area matching rate finally decreases to 0%. This example shows that at the position 604 the overlapping area is maximized, i.e., the overlapping area changes from increasing to decreasing. Therefore, the layout editing application 1 determines the percentage of the overlapping area of the leading-edge points at the position 604, at which the overlapping area is maximized, as the maximum area matching rate between the front and rear pages.

Figure 7:
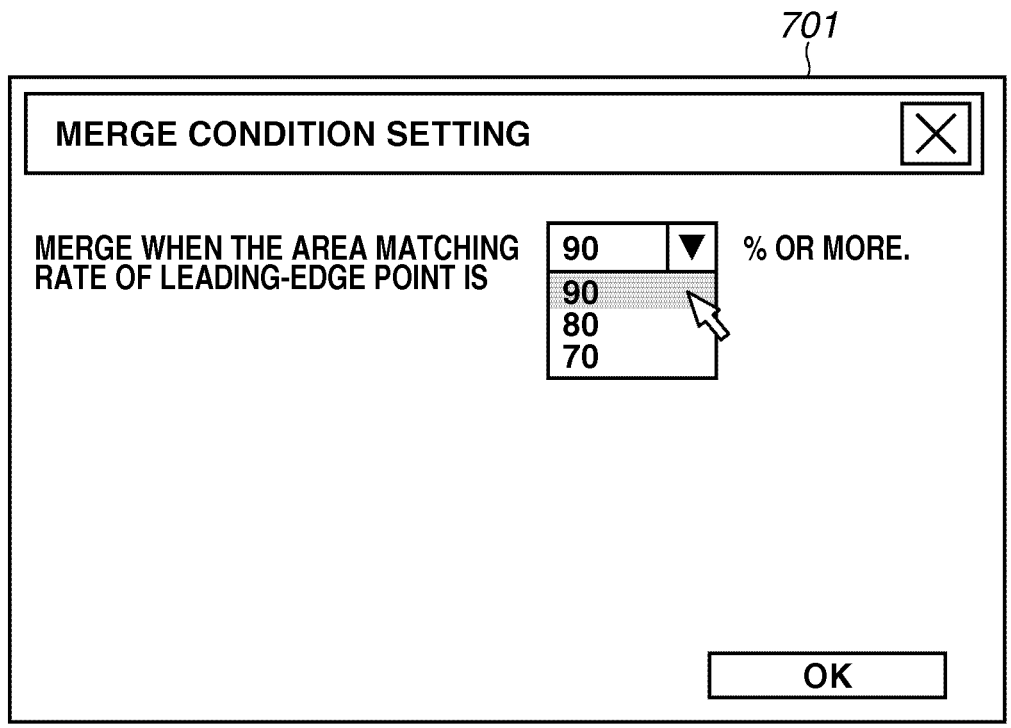
FIG. 7 illustrates an exemplary user interface for inputting a condition.

In step S304, the layout editing application 1 checks whether the maximum area matching rate between the mating leading-edge points between the front and rear pages is greater than a specific percentage. When the maximum area matching rate is greater than the specific percentage (YES in step S304), the layout editing application 1 advances the processing to step S309 to perform object merging processing. When there are a plurality of leading-edge points, the layout editing application 1 checks whether the area matching rate between all the mating leading-edge points is greater than the specific percentage at a position where the maximum area matching rate is calculated. A threshold value (specific percentage) of the maximum area matching rate may be predetermined by the system or selected by the user. FIG. 7 illustrates an exemplary user interface which allows the user to select a threshold value for the maximum area matching rate. More specifically, the document processing apparatus includes a condition acceptance unit configured to accept a condition setting (threshold value in the present exemplary embodiment) from the user. The present exemplary embodiment employs the layout editing application 1 as an exemplary condition acceptance unit.

In step S304, when the maximum area matching rate between the mating leading-edge points is less than the specific percentage (NO in step S304), the layout editing application 1 advances the processing to step S305.

As described in steps S301 to S303, the layout editing application 1 checks whether the objects can be vertically merged. Further, since area matching may arise horizontally, in steps S305 to S307, the layout editing application 1 checks the possibility of horizontal merging similarly to the possibility of vertical merging.

The processing of steps S305 to S307 is basically similar to the processing of steps S301 to 303 but different in a direction. Therefore, only the difference will be described below. In step S305, the layout editing application 1 analyzes the inside of the front page, and extracts a leading edge of a rightmost object as a leading-edge point. In step S306, the layout editing application 1 extracts a leading edge of a leftmost object on a page (rear page) next to the front page processed in step S305, as a leading-edge point. In step S306, the layout editing application 1 horizontally slides both the page processed in step S305 and the page processed in step S306 to calculate the area matching rate. For example, horizontal sliding of at least one of the front and rear pages can be carried out by sliding the pages only in the X-axis direction with a fixed Y-axis coordinate.

More specifically, the document processing apparatus includes the layout editing application 1 which extracts a leading edge of a first object at an end of a first page, and a leading edge of a second object at an end on the side facing the first page end on a second page following the first page. In addition, the layout editing application 1 extracts a leading edge of the first object at an utmost end of the first page, and a leading edge of the second object at an utmost end on the side facing the first page end on the second page following the first page. In the present exemplary embodiment, the first page is referred to as front page and the second page is referred to as rear page. The present exemplary embodiment employs the layout editing application 1 as an exemplary extraction unit configured to extract a leading edge of the first object and a leading edge of the second object.

Further, as illustrated in steps S303 and S307, the document processing apparatus includes a calculation unit configured to overlap the leading edge of the first object with the leading edge of the second object to calculate the area matching rate based on the overlapping area. More specifically, the exemplary embodiment employs the layout editing application 1 as an exemplary calculation unit.

In step S308, similarly to step S304, the layout editing application 1 checks whether the maximum area matching rate between the mating leading-edge points between the front and rear pages is greater than a specific percentage. When the maximum area matching rate is greater than the specific percentage (YES in step S308), the layout editing application 1 performs the object merging processing of step S309. When there are a plurality of leading-edge points, the layout editing application 1 checks whether the area matching rate between all the mating leading-edge points is greater than the specific percentage at a position where the maximum area matching rate is calculated. When the maximum area matching rate is less than the specific percentage (NO in step S308), the layout editing application 1 advances processing to step S311.

The layout editing application 1 performs the processing of step S309 when the maximum area matching rate between the front and rear pages is greater than the specific percentage in step S304 or S308. In step S309, since the area matching condition is suitable for merging mating objects, the layout editing application 1 merges the mating objects, as illustrated in FIG. 8. More specifically, the document processing apparatus includes a merging unit (for example, the layout editing application 1) configured to merge the leading edge of the first object with the leading edge of the second object when the calculated area matching rate satisfies a certain criterion. In a broad sense, the merging unit merges the leading edge of the first object with the leading edge of the second object when a result of overlapping the leading edge of the first object with the leading edge of the second object satisfies a condition.

FIG. 8 is a flow chart illustrating object merging processing, and FIGS. 8A to 8C are supplementary diagrams for the flow chart.

In step S1301, the layout editing application 1 slides leading-edge points in a direction perpendicular to the former direction to determine whether or not there is a position at which the maximum area matching rate further increases, as illustrated in 8A. The former direction refers to the direction in which the pages were slid in step S303 or S307. Therefore, the direction perpendicular to the former direction refers to the horizontal direction (when the former direction is the vertical direction) or the vertical direction (when the former direction is the horizontal direction).

When there is a position at which the maximum area matching rate increases (YES in step S1301), the layout editing application 1 advances processing to step S1302 to further increase the maximum area matching rate. More specifically, the layout editing application 1 determines a point at which the maximum area matching rate further increases which is found in step S1301, as a merging point. In other words, the layout editing application 1 calculates the area matching rate after performing adjustment such that the maximum area matching further increases. When there is no position at which the maximum area matching rate further increases (NO in step S1301), the layout editing application 1 advances processing to step S1303. In step S1303, the layout editing application 1 determines the position found in step S303 or S307 as a merging point.

A case where an object is split over pages will be described below. For example, when an inclined ruled line is split, the two mating positions at which the line is split may be shifted by several dots depending on a method for rounding coordinate values. When merging the split objects in such a case, the layout editing application 1 performs processing of steps S1301 and S1302 as finer adjustment processing to improve the accuracy of merging to obtain a neater result. The rounding process refers to rounding coordinate values of a split portion including decimal fractions, to integers.

More specifically, the layout editing application 1 vertically and horizontally overlaps the leading edge of the first object with the leading edge of the second object to calculate the area matching rate based on a maximum overlapping area. In other words, the document processing apparatus includes an adjustment unit configured to make adjustment so that the leading edge of the first object is merged with the leading edge of the second object at a position where the overlapping area of the leading edges of the first and second objects is maximized. The present exemplary embodiment employs the layout editing application 1 as an exemplary adjustment unit.

In step S1304, the layout editing application 1 cuts off an object contained on the rear page. In step S1305, the layout editing application 1 pastes the object on the rear page cut off in step S1304 onto a merging point on the front page (performs so-called the cut-and-paste operation for the object). The rear page from which the object is cut off in step S1304 becomes blank. Therefore, in step S1306, the layout editing application 1 deletes the rear page which is no longer necessary. This completes the object merging processing, and the layout editing application 1 advances the processing to step S310.

In step S310, the layout editing application 1 performs processing for repeating merging check from the first page for the pages (or document) in which the document configuration has been updated by the object merging processing of step S309. More specifically, the layout editing application 1 resets the target of the processing to the first page and then returns control to step S301. This processing is required when an object is arranged over three or more pages, as illustrated in FIG. 1.

Figure 1:
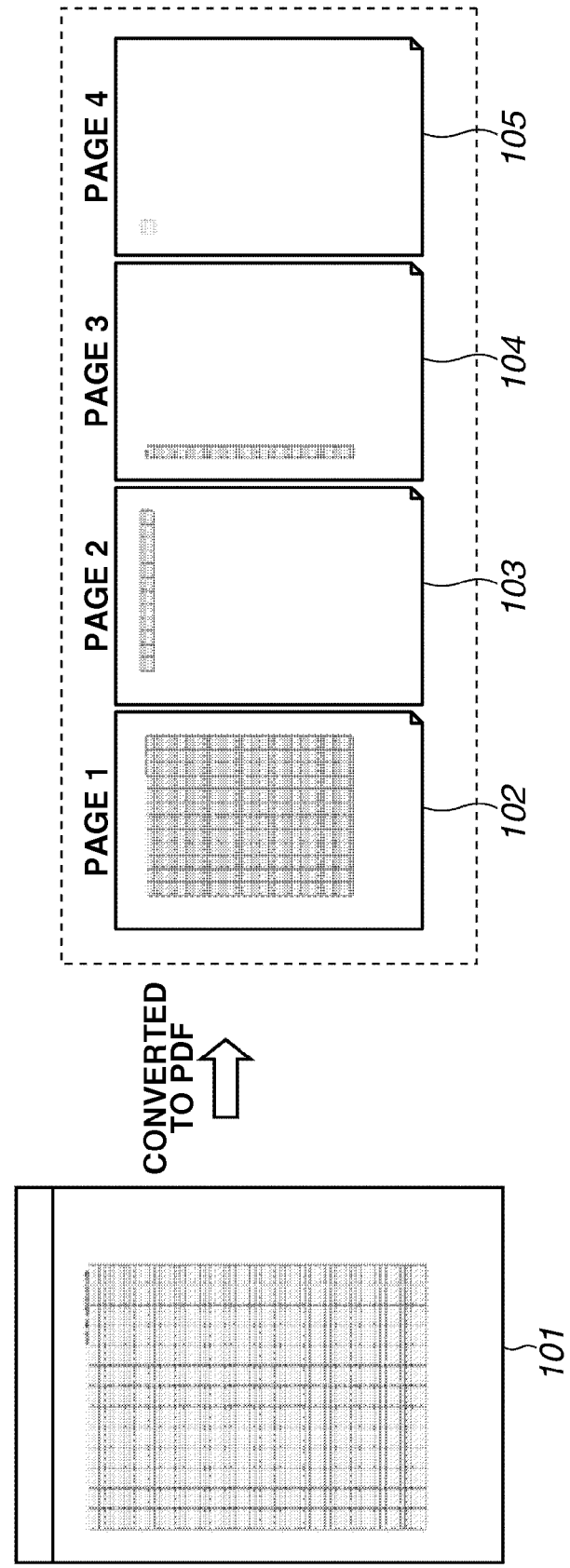
FIG. 1 illustrates an exemplary conversion of spreadsheet application data to a page description language.

More specifically, with reference to FIG. 1, in a case where the object merging processing is simply performed only when a pair is found from the first page, firstly the lowermost portion of an object 102 is merged with the uppermost portion of an object 103, and secondly the lowermost portion of an object 104 is merged with the uppermost portion of an object 105. However, if the layout editing application 1 does not perform merging check from the first page each time the document configuration is updated, it will miss an opportunity to merge the result of merging of the objects 102 and 103 and the result of merging of the objects 104 and 105. Therefore, each time the object merging processing is completed, the layout editing application 1 resets the target of merging check to the first page and then repeats the processing from step S301.

When the maximum area matching rate between the front and rear pages is less than the specific percentage (NO in step S308), the layout editing application 1 advances the processing to step S311. In step S311, the layout editing application 1 determines whether or not the rear page is the last page. When the rear page is the last page of the document (YES in step 311), the layout editing application 1 advances the processing to step S313. When the rear page is not the last page of the document (NO in step S311), in other words, when there is at least one unchecked page, the layout editing application 1 advances the processing to step S312.

In this merging processing, the layout editing application 1 prepares a pair of pages, and increments the pair of pages (each of the front and rear pages) by one in step S312. For example, when the first and second pages have been processed, in step S312, the layout editing application 1 sets the target of processing to the second and third pages. After completion of the processing of step S312 (after incrementing the target pages), the layout editing application 1 returns control to step S301 to repeat the above-mentioned processing.

When the rear page is the last page of the document (YES in step S311), in other words, when merging check is completed for all pages of the document, the layout editing application 1 advances the processing to step S313. In step S313, when an object runs off to another page after merging the objects, the layout editing application 1 reduces the size of the object so that it fits into the page after merging.

More specifically, the document processing apparatus includes a reduction unit (for example, the layout editing application 1) configured to reduce the size of an object so that it fits into the page after merging.

Figure 9:
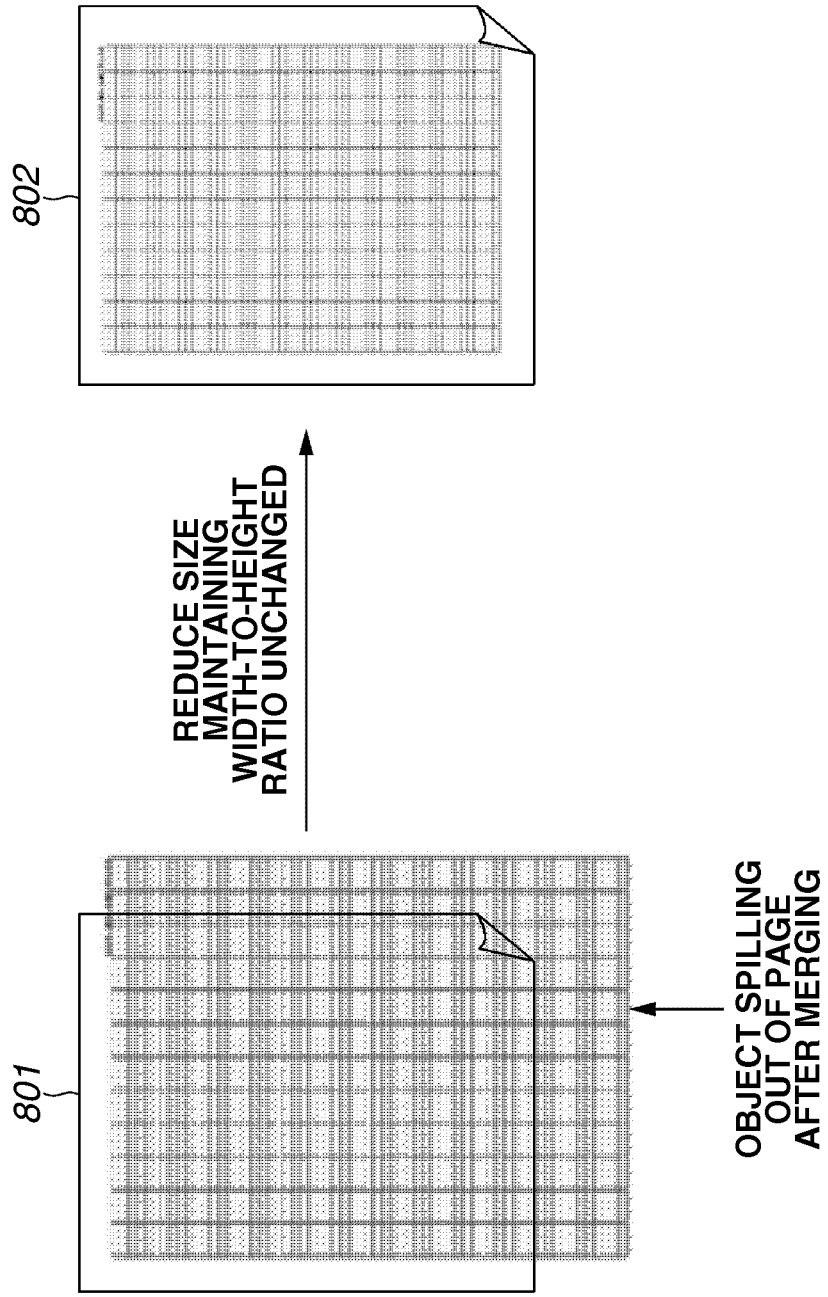
FIG. 9 illustrates an exemplary reduction processing.

A method for adjusting the size of an object used by the layout editing application 1 will be described below with reference to FIG. 9. As illustrated in FIG. 9, the layout editing application 1 reduces the entire object after the merging such that a largest possible circumscribed quadrangle of the object fits into the page size (for example, adjustment from an object size 801 to an object size 802). In this case, the layout editing application 1 reduces the object so that the width-to-height ratio remains unchanged.

The present exemplary embodiment makes it possible to check an association between objects which may have been split over pages and merge the objects which should be normally merged into one. The present exemplary embodiment also makes it possible to automatically make reduction layout of an object which runs off to another page after merging.

When application data without the page concept is converted to page description data as a source in this way, a part of an object may unexpectedly run off to another page. However, the document processing apparatus can detect an association between mating objects over pages and re-merge them while automatically making layout adjustments. More specifically, as illustrated in FIG. 1, even if a user cannot obtain a desired result, the document processing apparatus returns to application operations to adjust application data, eliminating the need of performing format conversion again. The document processing apparatus can make layout adjustments even in a case where, although application data of a document is converted to another format and the data is delivered in a document system, the application data of the document is lost and cannot be rebuilt.

In the first exemplary embodiment, in steps S301 to S304, the layout editing application 1 checks the area matching rate to determine whether or not the lowermost object on the front page can be merged with the uppermost object on the rear page. After completion of the processing of steps S301 to S304, the layout editing application 1 performs the processing of steps S305 to S308 to check the area matching rate to determine whether or not the rightmost object on the front page can be merged with the leftmost object on the rear page. More specifically, when the layout editing application 1 merges the rightmost object on the front page with the leftmost object on the rear page, the efficiency can be improved if the processing of steps S301 to S304 is omitted.

In a second exemplary embodiment, therefore, the layout editing application 1 analyzes the configuration of an object on the rear page before starting document processing which begins with step S301 of FIG. 3. More specifically, to estimate whether or not a lowermost object on the front page and an uppermost object on the rear page should be checked first, the layout editing application 1 performs page analysis, before starting the processing of step S301, to such an extent that the processing performance is not degraded. This configuration allows processing to be efficiently performed.

Figure 10:
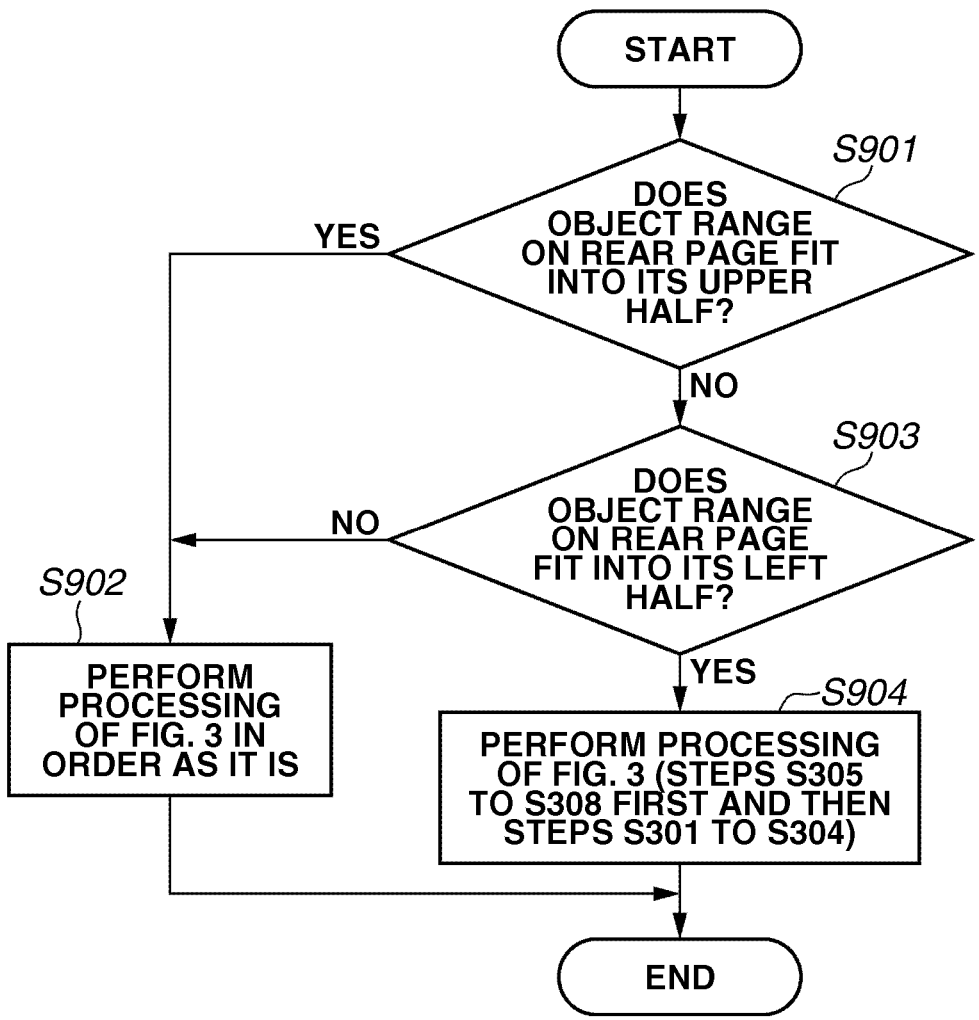
FIG. 10 is a flow chart illustrating processing performed by the document processing apparatus.
Figure 11:
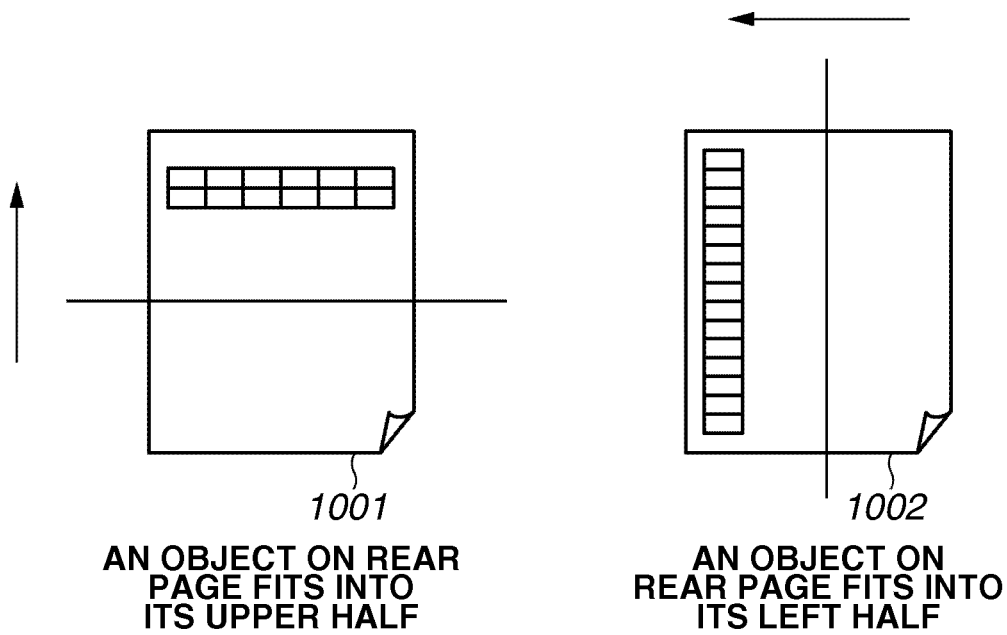
FIG. 11 illustrates a visualized condition for determining an object area.

An exemplary analysis will be described below with reference to FIG. 10. In step S901, the layout editing application 1 checks whether or not an object range 1001 on the rear page fits into its upper half, as illustrated in FIG. 11. When the object range 1001 on the rear page fits into its upper half (YES in step S901), it is highly likely that the lowermost object on the front page can be merged with the uppermost object on the rear page. Therefore, when the object range 1001 on the rear page fits into its upper half (YES in step S901), the layout editing application 1 advances processing to step S902 to perform the processing of FIG. 3 in the order as it is.

When the object range 1001 on the rear page does not fit into its upper half (NO in step S901), the layout editing application 1 advances processing to step S903. In the processing of step S903, the layout editing application 1 checks whether an object range 1002 on the rear page fits into its left half, as illustrated in FIG. 11. When the object range 1002 on the rear page fits into its left half (YES in step S903), it is not likely that the lowermost object on the front page can be merged with the uppermost object on the rear page, and it is highly likely that the rightmost object on the front page can be merged with the leftmost object on the rear page. When the object range 1002 on the rear page fits into its left half (YES in step S903), the layout editing application 1 advances processing to step S904 to perform the processing of FIG. 3 in reverse order (steps S305 to S308 first and then steps S301 to S304). More specifically, the layout editing application 1 first checks the area matching rate between the rightmost object on the front page and the leftmost object on the rear page and then the area matching rate between the lowermost object on the front page and the uppermost object on the rear page.

More specifically, the document processing apparatus includes a specification unit configured to analyze the second page to specify the position, size, and range of the second object. Then, the layout editing application 1 determines whether the leading edge of the first object is overlapping with the leading edge of the second object preferentially in the vertical or horizontal direction based on the specified position, size, and range. Further, the layout editing application 1 overlaps these ends preferentially in the determined direction to calculate the area matching rate based on the overlapping area. The present exemplary embodiment employs the layout editing application 1 as an exemplary specification unit.

Conditions for the determination processing of step S901 include a threshold value for determining the uppermost half of the page as an object range. Conditions for the determination processing of step S903 include a threshold value for determining the left half of the page as an object range. However, the configuration of the present exemplary embodiment is not limited thereto. A threshold value may be variable, for example, the user can provide a threshold value from 0% to 100%.

More specifically, since the processing for extracting leading-edge points of objects and calculating the area matching rate by sliding mating objects imposes a burden on the document processing apparatus, skipping as much processing as possible will improve the performance of the document processing apparatus. Therefore, in the second exemplary embodiment, the layout editing application 1 does not sequentially perform steps S301 to S308. More specifically, the layout editing application 1 analyzes the configuration of objects on the rear page to determine whether the processing of steps S301 to S304 or the processing of steps S305 to S308 should be performed first. The layout editing application 1 first performs processing involving a larger area matching rate between mating objects and skips the other processing which may possibly be a waste of time, thus improving the performance of the document processing apparatus.

As described in the first exemplary embodiment, performing the processing of steps S301 to S308 for all pairs of pages may largely affect the performance particularly when processing a document having a number of pages. Therefore, a third exemplary embodiment allows the user to set a condition for skipping the processing of steps S301 to S308 when priority is given to the processing performance.

More specifically, to increase the processing speed of the document processing apparatus, the layout editing application 1 performs the processing of steps S301 to S308 of FIG. 3 only when the characteristics of an object on the rear page do not satisfy a specific condition. When the characteristics of the object satisfy the specific condition, the layout editing application 1 skips the processing of steps S301 to S308 and directly proceeds to the processing of step S311, thus increasing the processing speed of the document processing apparatus.

In many cases where an object runs off to another page, the object occupies a slight area of another page, as illustrated in the pages 103 to 105 of FIG. 1. Therefore, the layout editing application 1 analyzes the rear page before performing the processing of step S301 and, only when the ratio of the area occupied by the object to the entire area of the page is less than a fixed value, the layout editing application 1 starts the processing of step S301. When the ratio of the area occupied by the object exceeds a fixed value, the layout editing application 1 directly proceeds to the processing of step S311.

More specifically, the document processing apparatus includes a determination unit configured to analyze the second page to determine whether the second object is within a specified range of the second page. When the determination unit determines that the second object is within the specified range, the layout editing application 1 calculates the area matching rate. The present exemplary embodiment employs the layout editing application 1 as an exemplary determination unit.

Figure 12:
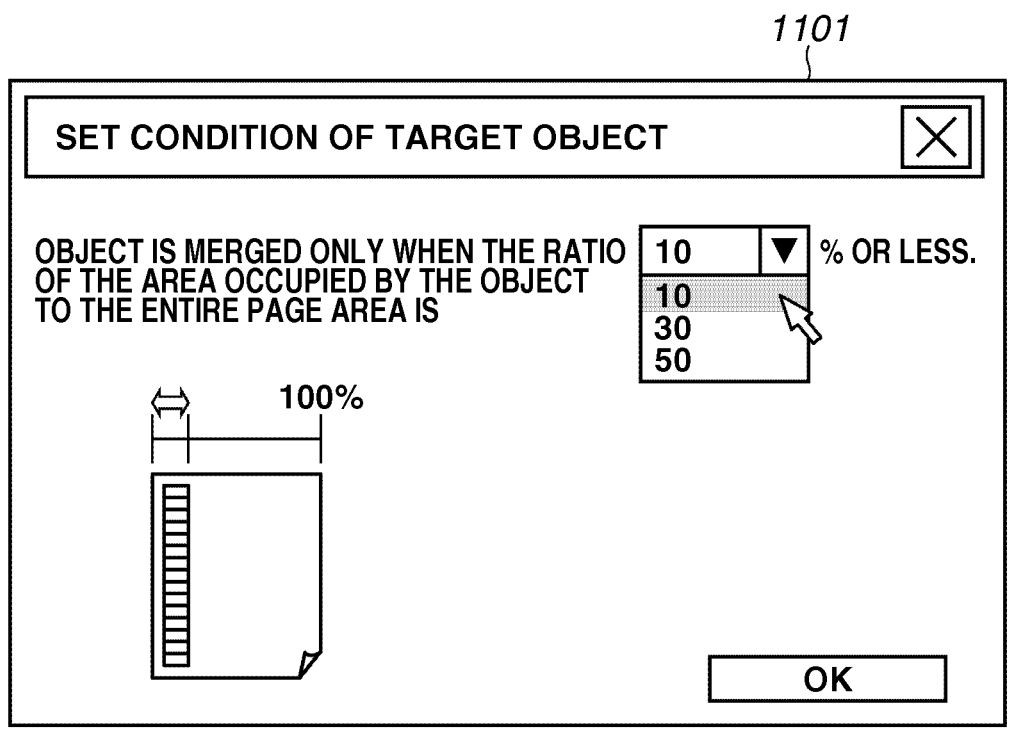
FIG. 12 illustrates an exemplary user interface for inputting a condition.

When a specific condition is satisfied in this way, the processing speed of the document processing apparatus is increased. In this case, however, since the processing for checking the area matching rate (steps S301 to S308) is skipped, the accuracy in the object merging processing may decrease. Therefore, the third exemplary embodiment allows the user to select whether priority is given to the processing performance or to the accuracy of the object merging processing. To realize this configuration, the present exemplary embodiment provides the user interface as illustrated in FIG. 12, which allows the user to adjust the accuracy. More specifically, the document processing apparatus includes a specified range acceptance unit configured to accept a specified range setting from the user. The present exemplary embodiment employs the layout editing application 1 as an exemplary specified range acceptance unit.

Therefore, the document processing apparatus according to the third exemplary embodiment allows the user to determine whether priority is given to the processing performance or to the accuracy of the object merging processing.

Figure 13:
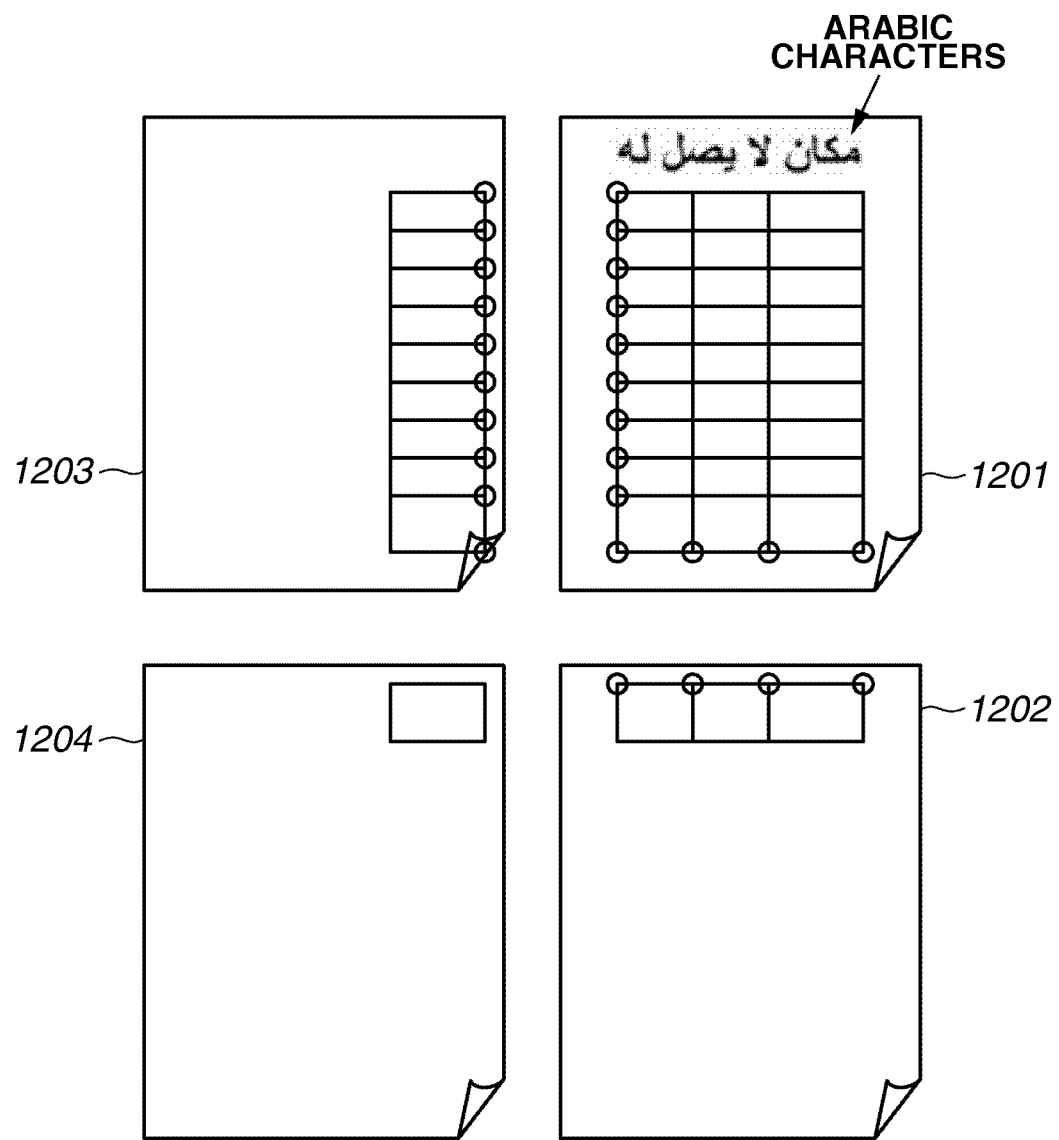
FIG. 13 illustrates an exemplary document based on right-to-left description.

The first exemplary embodiment is based on the left-to-right description format. There is generally no problem with that embodiment since documents are commonly described in the left-to-right description format. However, in some districts in Arabic and Hebrew linguistic areas, the right-to-left description format is used. In these linguistic areas, since application style sheets may be based on the right-to-left description format, documents are described from right to left in some cases. An exemplary right-to-left description format is illustrated in FIG. 13. Processing based on this format by the layout editing application 1 will be described below. In some documents such as PDF, the encoding type handled in a document is described to denote a linguistic area where the document was created.

The document illustrated in FIG. 13 includes an object 1201 on page 1, an object 1202 on page 2, an object 1203 on page 3, and an object 1204 on page 4. When this document is applied to the first exemplary embodiment, the lowermost portion of the object 1201 is merged with the uppermost portion of the object 1202, and the lowermost portion of the object 1203 is merged with the uppermost portion of the object 1204. There is no problem in the processing so far. However, in the first exemplary embodiment which is based on the left-to-right description format, there arises a problem that the processing for merging the rightmost end of one object (formed by merging the objects 1201 and 1202) with the leftmost end of the other object (formed by merging the objects 1203 and 1204) is started.

In a fourth exemplary embodiment, therefore, when the right-to-left description format is recognized, the layout editing application 1 performs the processing of steps S305 to S308 in FIG. 3 with the right and left sides reversed. This configuration can cope with the right-to-left description format.

More specifically, when a document is described in the left-to-right description format, the layout editing application 1 extracts a leading edge of the rightmost object on the first page and a leading edge of the leftmost object on the second page. When the document is described in the right-to-left description format, the layout editing application 1 extracts a leading edge of the leftmost object on the first page and a leading edge of the rightmost object on the second page. The document includes the first and second pages.

The layout editing application 1 checks the encoding type in the document in this way. In a broad sense, the layout editing application 1 determines the applied description format to enable automatic selection of the processing for each description format. Although description has been made that the present exemplary embodiment is performed by the layout editing application 1, a printer driver may perform it. When the printer driver performs the present exemplary embodiment, the layout editing application 1 needs to prepare a necessary printer driver.

When an object is drawn over pages, drawing may be performed by using a clip. To completely cut an object and arrange one piece of object on the front page and another piece on the rear page, the processing for analyzing the data of the object for cutting is time-consuming. Therefore, a technique of clip-based apparent splitting (object splitting) may be used.

Figure 14:
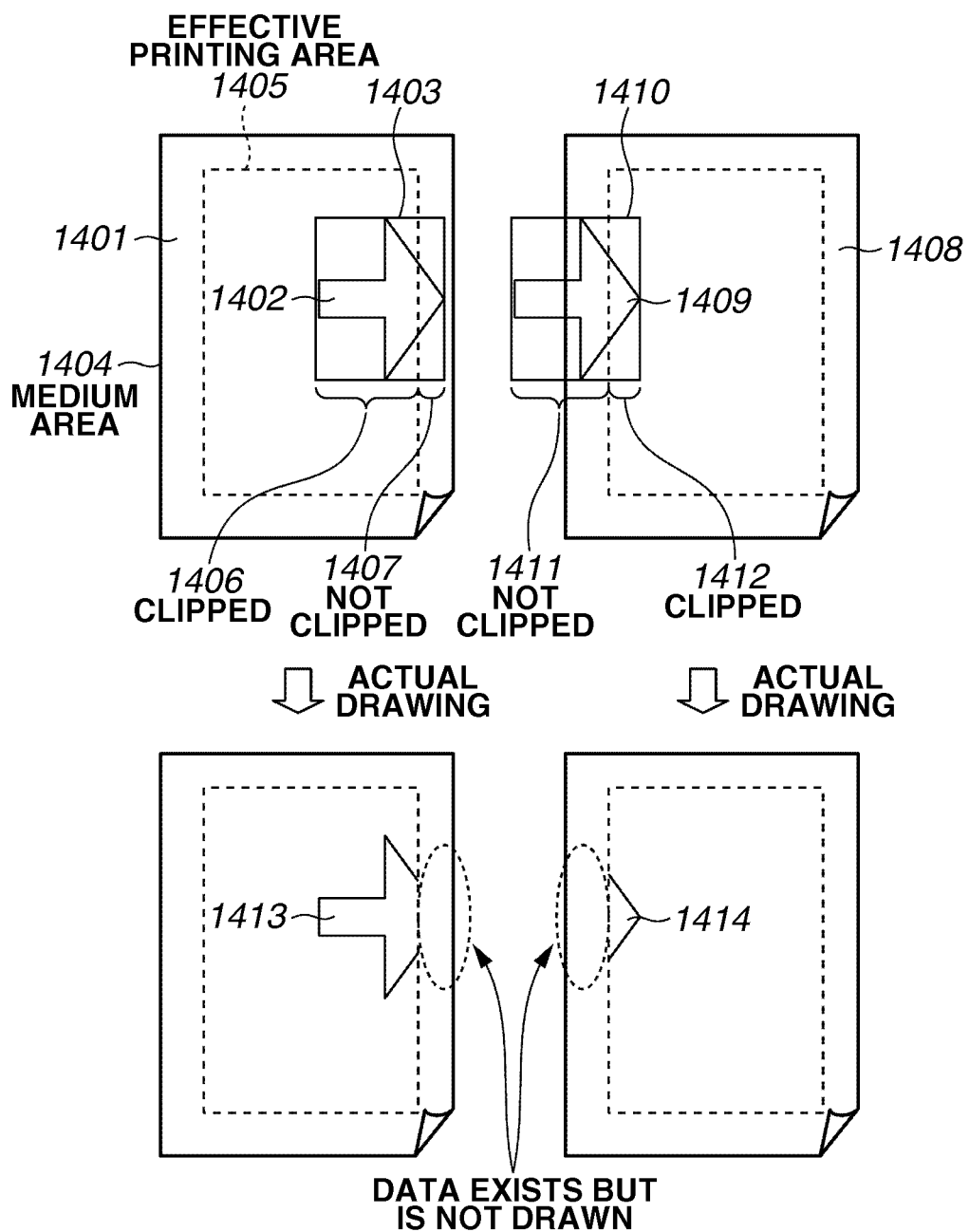
FIG. 14 illustrates an exemplary object drawing by using a clip.

As a fifth exemplary embodiment, exemplary clip-based object splitting will be described below with reference to FIG. 14. A front page 1401 includes an object 1402 which runs off an effective printing area 1405. At the same time, a rear page 1408 includes an object 1409 which is identical to the object 1402 running off the front page 1401.

Further, when the front page 1401 includes a circumscribed quadrangle 1403 of the object 1402, an area 1406 having a boundary of the effective printing area is enabled and a drawing result 1413 is provided. When the rear page 1408 includes a circumscribed quadrangle 1410 of the object 1409, an area 1412 is enabled and a drawing result 1414 is provided. Actually, however, an identical object is arranged both on the front page 1401 and the rear page 1408, in other words, apparent splitting is performed.

The clip is a storage area for temporarily storing on a page basis an object drawn over pages. A portion of the object at a position where the clip is enabled (clipped) is drawn, and a portion of the object at a position where the clip is disabled (not clipped) is not drawn. More specifically, the clip is used to perform apparent splitting to save trouble in cutting an existing object.

Figure 15:
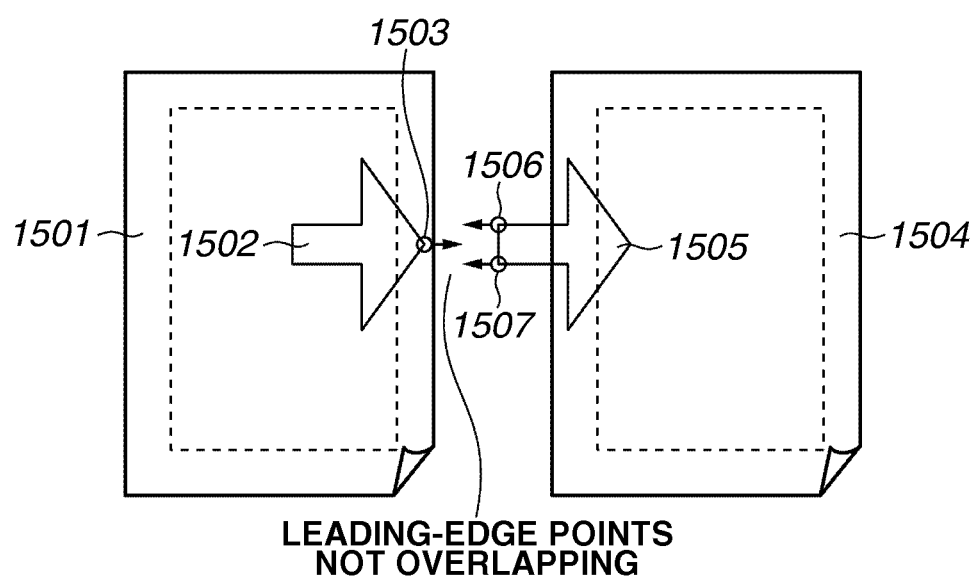
FIG. 15 illustrates an exemplary state where mating leading-edge points do not overlap with each other.

When the layout editing application 1 performs processing for extracting leading-edge points (leading-edge point extraction processing) based on the techniques performed in steps S301, S302, S305, and S306 in the first exemplary embodiment, leading-edge points as illustrated in FIG. 15 are extracted.

More specifically, since each of a front page 1501 and a rear page 1504 includes an unsplit object as it is, a leading-edge point 1503 is extracted as a leading-edge point of an object 1502 on the front page 1501. Further, leading-edge points 1506 and 1507 are extracted as a leading-edge point of an object 1505 on the rear page 1504. In this case, since the leading-edge point 1503 of the object 1502 on the front page 1501 does not overlap with the leading-edge points 1506 and 1507 of the objects 1505 on the rear page 1504, the two objects cannot be re-merged.

When clip-based object splitting is performed at a boundary of the effective printing area in this way, an identical object exists at the rightmost end of the front page and the leftmost end of the rear page, or at the lowermost end of the front page and the uppermost end of the rear page. Therefore, when both the front and rear pages include an object running off the respective effective printing area, it is not desirable to extract leading-edge points depending on whether or not matting leading edges of the objects are suitable to be merged, similarly to the processing of steps S301, S302, S305, and S306. More specifically, it is necessary to calculate the area matching rate from the viewpoint whether it is suitable to superimpose the objects on each other.

Figure 16:
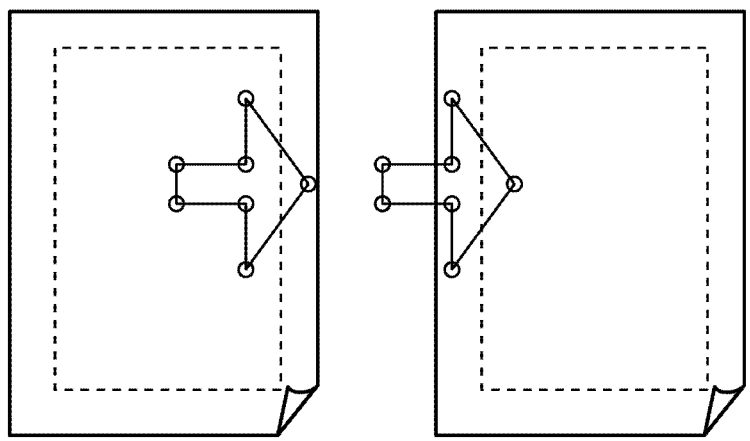
FIG. 16 illustrates an exemplary state where leading-edge points are arranged on control points of an object.

Therefore, as illustrated in FIG. 16, the present exemplary embodiment employs a method for forming leading-edge points at control points of the objects. A control point refers to a coordinate point for controlling graphic drawing. For more specific example, in case of a straight line, starting and ending points serve as control points and leading-edge points are formed at the coordinate points of these control points. For another example, the Bezier curve is used when handling a curve on computer graphics. When an Nth order curve (N is a natural number) is drawn, N+1 coordinate points for performing control are placed. Leading-edge points are formed at the N+1 coordinate points.

Figure 17:
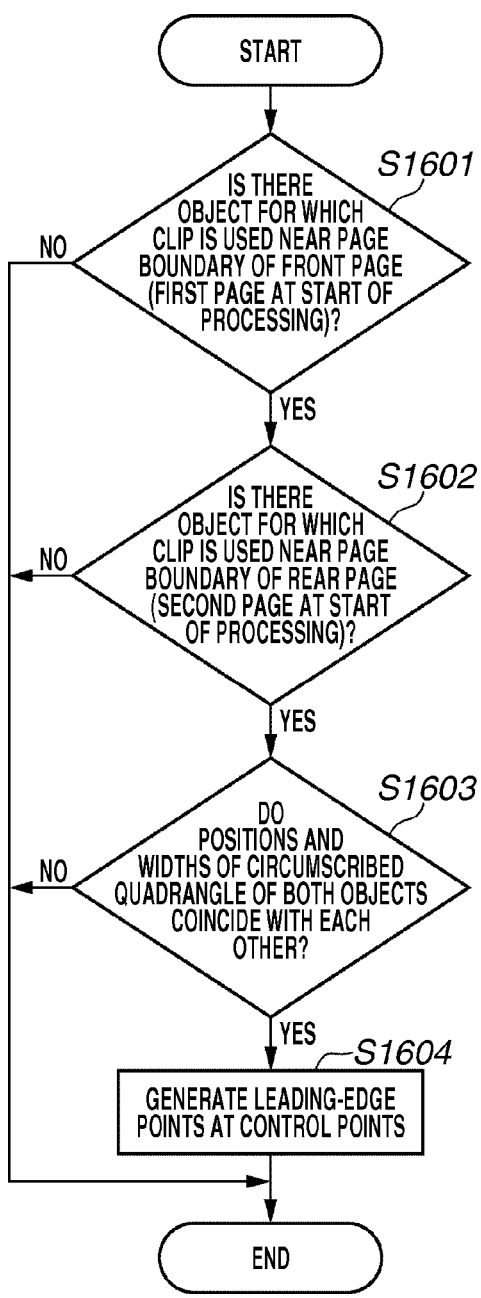
FIG. 17 is a flow chart illustrating processing for forming leading-edge points.

A method for determining a condition under which leading-edge points should be placed on control points will be described in more detail below with reference to FIG. 17.

In step S1601, as illustrated in FIG. 16A (a supplementary diagram for the flow chart), the layout editing application 1 checks whether or not there is an object for which the clip is used beyond the page boundary (for example, the effective printing area) of the front page. For example, when the target electronic document is a PDF document, since a command W for defining a clipping path is given, the layout editing application 1 performs the above-mentioned check by grasping how the W command is set within the electronic document. The clipping path can be set by arranging the W command after path construction.

Therefore, the layout editing application 1 checks whether or not a circumscribed quadrangle of an object runs off to another page similarly to the circumscribed quadrangle 1403 and a defined clipping path is arranged along the page boundary similarly to the area 1406 for the object. A page boundary refers to a boundary of the medium (sheet) and a boundary of the effective printing area. As illustrated in 16A, when there is an object for which the clip is used beyond the page boundary of the front page (YES in step S1601), the layout editing application 1 advances processing to step S1602. Otherwise (NO in step S1601), the layout editing application 1 determines that clip-based object splitting is not performed and then terminates the processing.

In step S1602, as illustrated in 16B (a supplementary diagram for the flow chart), the layout editing application 1 checks whether there is an object for which the clip is used beyond the page boundary of the rear page. As illustrated in 16B, when there is an object for which the clip is used beyond the page boundary of the rear page (YES in step S1602), the layout editing application 1 advances processing to step S1603. Otherwise (NO in step S1602), the layout editing application 1 determines that clip-based object splitting is not performed and then terminates the processing. The present exemplary embodiment employs the layout editing application 1 as an exemplary determination unit configured to determine whether or not there is any object portion which is not drawn.

In step S1603, the layout editing application 1 determines whether or not the clip-related objects checked in steps S1601 and S1602 are overlapping with each other (primary determination).

Since objects are overlapping only when both the position and width of circumscribed quadrangles (square frames enclosing the entire object) of the objects coincide with each other, as illustrated in 16C (a supplementary diagram for the flow chart), the layout editing application 1 determines whether or not the position and width coincide with each other. When the position and width coincide with each other (YES in step S1603), the layout editing application 1 performs the processing of step S1604. Otherwise (NO in step S1603), it determines that clip-based object splitting is not performed and then terminates the processing.

In step S1604, the layout editing application 1 forms leading-edge points for calculating the area matching rate at the control points of the objects checked in steps S1601 and S1602. Then, it terminates the processing. The present exemplary embodiment employs the layout editing application 1 as an exemplary determination unit configured to determine control points of an object as its leading edges.

Subsequently, the layout editing application 1 starts the processing of step S301 in the first exemplary embodiment. However, since it is not necessary to perform the processing of steps S301 to S303 and 5305 to 5307 for the objects to which leading-edge points have already been given in step S1604, the layout editing application 1 skips these steps.

In step S1305 of the object merging processing, the object cut off from the rear page is pasted at a merging point on the front page. Therefore, the layout editing application 1 determines that one of the two objects is no longer necessary and deletes it to save resources. The present exemplary embodiment employs the layout editing application 1 as an exemplary specification unit configured to specify an object.

When forming leading-edge points at control points in step S1604, the more complex the graphics, the more control points are formed. Therefore, in consideration of the influence on the performance, the layout editing application 1 may reduce the number of leading-edge points, for example, by thinning out three leading-edge points to one point or limiting the maximum number of points to 10.

When a text object is drawn between pages, clip-based object splitting is performed as described in the fifth exemplary embodiment. However, a text object has attribute values (for example, first information about objects on the front page and second information about objects on the rear page) specific to text data. Checking object matching based on these text attribute values requires less amount of calculations and it can be determined more accurately whether or not the objects are matched than when leading-edge points are extracted from control points of text to calculate the area matching rate.

Figure 18:
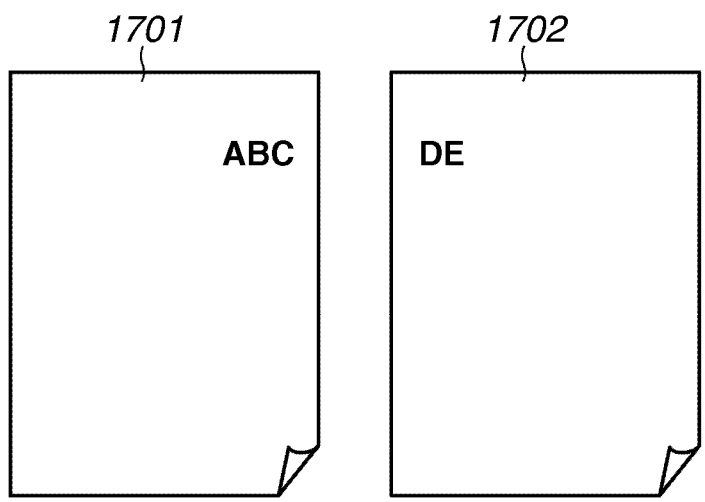
FIG. 18 illustrates an exemplary text object split over pages.

FIG. 18 illustrates a text object apparently split over pages according to the sixth exemplary embodiment of the present invention. Some characters which do not fit into a front page 1701 are arranged from the leftmost end of a rear page 1702. At this time, the layout editing application 1 does not define control points of a graphic function included in the text data as leading-edge points to calculate the area matching rate. Instead, the layout editing application 1 determines whether or not the text objects are to be merged, based on the text attribute values. More specifically, in the fifth exemplary embodiment, when the target object is a text object in step S1604, the layout editing application 1 determines whether or not the text objects are to be merged based on the text attribute values. More specifically, when both objects coincide with each other in font size, color, font type, and text code, the layout editing application 1 skips the processing for calculating the area matching rate and performs the object merging processing to merge the objects. A sixth exemplary embodiment employs the layout editing application 1 as an exemplary determination unit configured to determine whether or not the first and second information coincide with each other.

When merging image objects, the area matching rate can be calculated by placing leading-edge points at a leading edge of a circumscribed quadrangle of image data. However, similarly to the text object merging process described in the sixth exemplary embodiment, it is also possible to determine whether or not split objects are matched by using attribute values included in the image data.

In a seventh exemplary embodiment, an original image object is split over the front and rear pages, as illustrated in the first exemplary embodiment. When an image object is split over the front and rear pages, it is common that an image in a cut area in the vicinity of the page boundary is drawn on both the front and rear pages.

Figure 19:
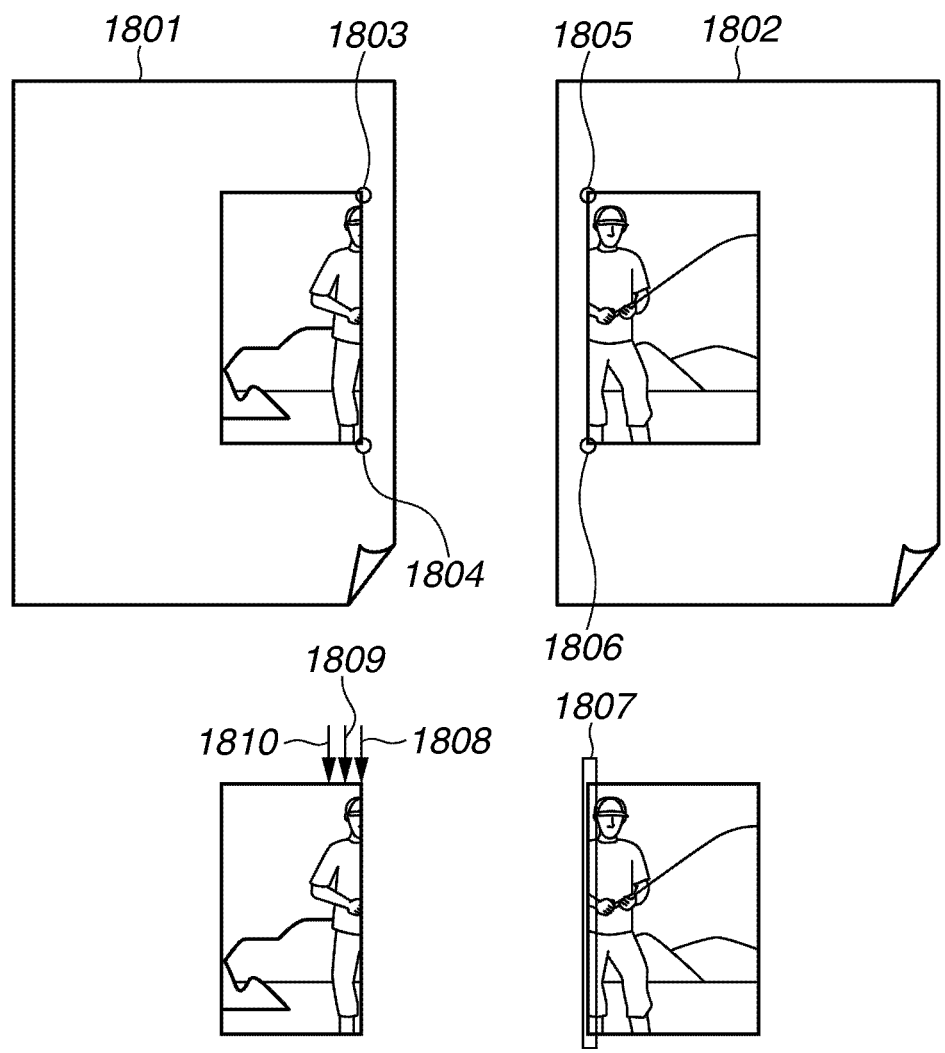
FIG. 19 illustrates an exemplary image object split over pages.

More specifically, as illustrated in FIG. 19, one piece of image data is drawn on a front page 1801 and another piece on a rear page 1802. An image in a cut area in the vicinity of the page boundary is drawn on both pages. Thus, to make it easier to view cut portions, the image data is cut so that an area for overlapping drawings is formed, and pieces of image data are arranged on the front and rear pages.

When image data is cut so that an area for overlapping drawings is formed in this way, each piece of image data arranged on the front and rear pages includes at least one identical data array of drawings. Therefore, the layout editing application 1 determines whether or not image objects are matched by checking whether any identical portion is included in a specific data array in one piece of image data on the front page and a specific data array in another piece of image data on the rear page.

More specifically, when corners of a circumscribed quadrangle of the image on the front page and corners of a circumscribed quadrangle of the image on the rear page are located on the page boundary, the layout editing application 1 checks whether or not both images are matched. Both images are on the page boundary when leading-edge points have been formed in steps S301 and S302 or steps S305 and S306 in the first exemplary embodiment. For example, as illustrated in FIG. 19, leading-edge points 1803 and 1804 are formed in step S305, and leading-edge points 1805 and 1806 are formed in step S306.

In this case, the layout editing application 1 picks up a data array 1807 which is closest to the front page among image data on the rear page. Further, the layout editing application 1 checks whether or not the image data on the front page includes any identical array, starting from a data array 1808 which is closest to the rear page. Then, the layout editing application 1 performs similar check for data arrays 1809, 1810, and so on. When an identical array is detected, the layout editing application 1 performs the object merging process to merge both image objects at the matched point (data array). The present exemplary embodiment employs the layout editing application 1 as an exemplary comparison unit configured to compare data arrays of objects.

The first exemplary embodiment samples the data by using the procedure (at positions 602, 603, 604, 605, and 606) illustrated in FIG. 6 to calculate the area matching rate in steps S303 and S307. Since this sampling processing requires a large amount of calculations and therefore may become a bottleneck for the entire processing in the document processing apparatus, it is preferable to reduce the amount of calculations as much as possible.

Figure 20:
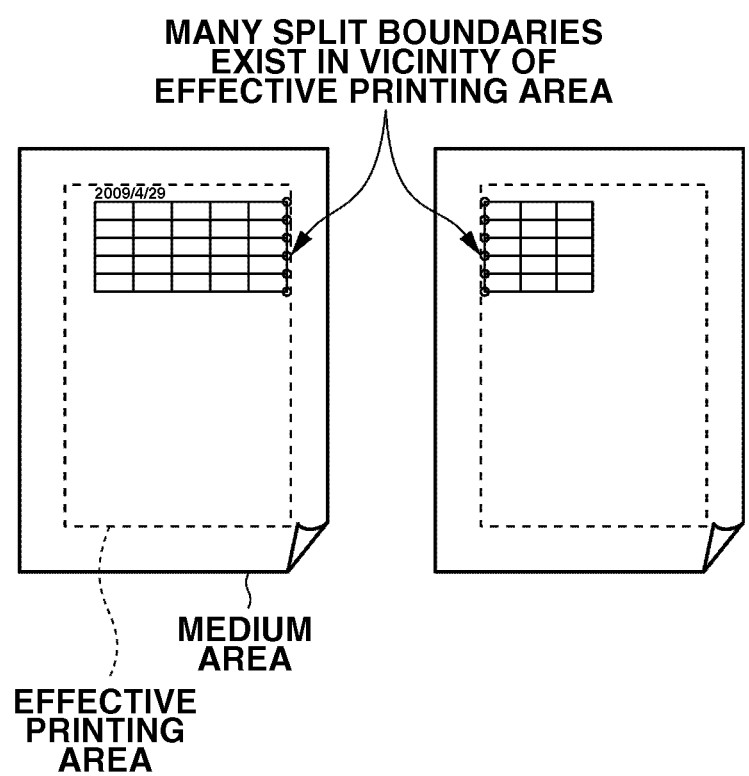
FIG. 20 illustrates an exemplary object split in the vicinity of an effective printing area.

As illustrated in FIG. 20, almost all objects are split in the vicinity of the effective printing area. Therefore, in an eighth exemplary embodiment, when the effective printing area (an exemplary display specification area) is specified (set) in an electronic document, the amount of calculations is reduced by starting area matching rate calculation from a position (location) in the vicinity of the boundary (for example, overlapping boundary lines) between the effective printing area of both pages. An area within a range in which a leading-edge point is shifted several ten times from the boundary line of the effective printing area, is defined as the vicinity of the boundary.

Figure 21:
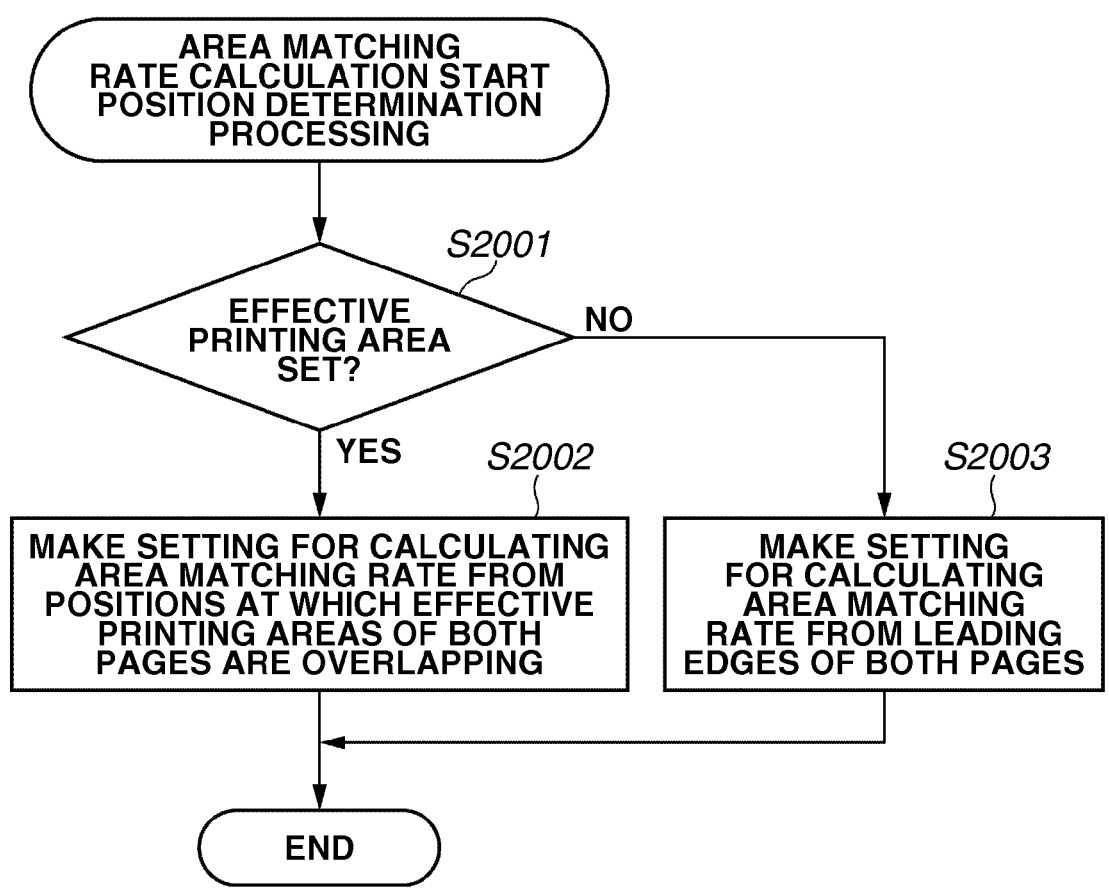
FIG. 21 is a flow chart illustrating processing for determining a starting position of area matching rate calculation.

FIG. 21 is a flow chart illustrating processing for determining a starting position of area matching rate calculation. It is more suitable that the processing for determining a starting position of area matching rate calculation is performed immediately before performing the processing for calculating the area matching rate illustrated in steps S303 and S307.

In step S2001, the layout editing application 1 checks whether or not an effective printing area is set in the electronic document currently being processed. The present exemplary embodiment employs the layout editing application 1 as an exemplary check unit configured to check whether or not a display specification area has been set.

Figure 22:
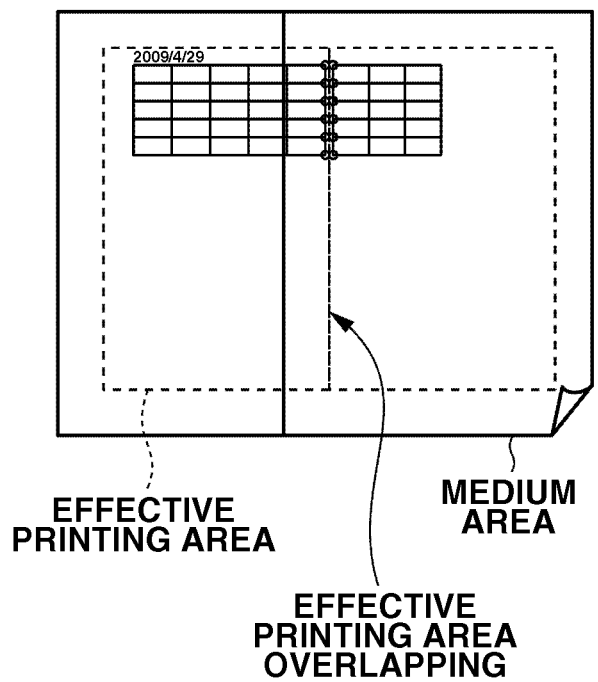
FIG. 22 illustrates an exemplary state where area matching rate calculation is started from the effective printing area.

When an effective printing area is set (YES in step S2001), the layout editing application 1 advances processing to step S2002 to make setting for calculating the area matching rate from a position at which the effective printing area of the front page is overlapping with that of the rear page, as illustrated in FIG. 22. When an effective printing area is not set (NO in step S2001), the layout editing application 1 advances processing to step S2003 to make setting for calculating the area matching rate from the leading edges of both pages.

Figure 23:
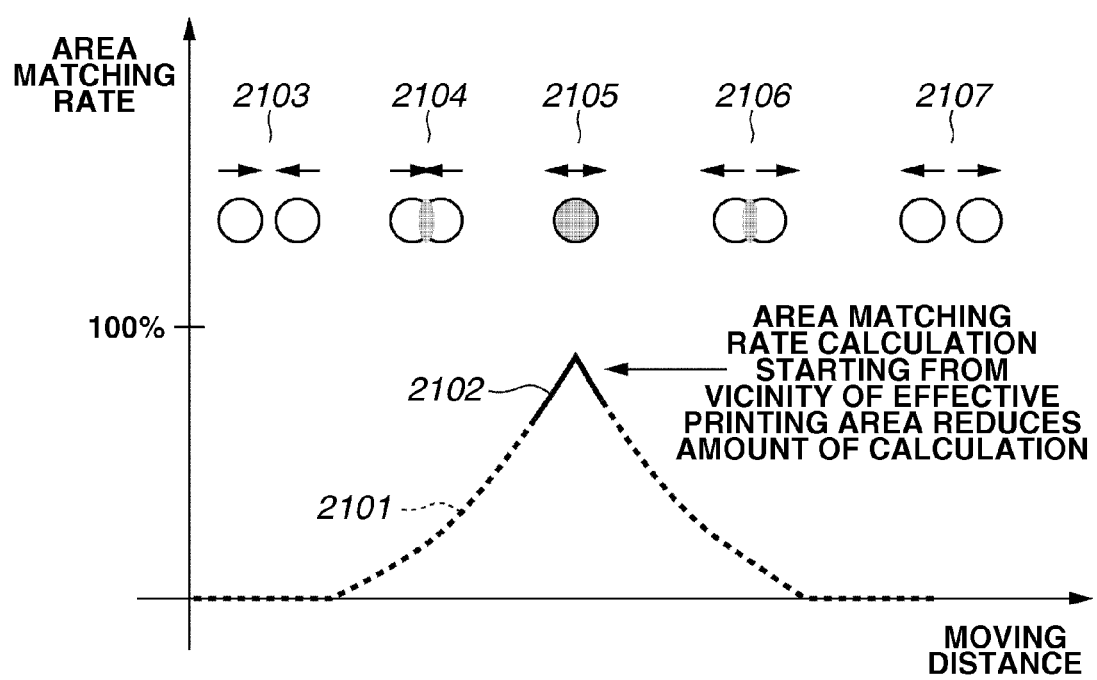
FIG. 23 illustrates an exemplary analysis result of the area matching rate in the vicinity of the effective printing area.

When calculating the area matching rate from the effective printing areas, the present exemplary embodiment samples the data only at positions on a solid line 2102 while the first exemplary embodiment samples the data also at positions on a dotted line 2101, as illustrated in FIG. 23. This configuration can reduce the amount of calculations. According to the present invention, objects once split over pages can be re-merged.

OTHER EMBODIMENTS

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-034241 filed Feb. 17, 2009, which is hereby incorporated by reference herein in its entirety.

What is claimed is:

1. A document processing apparatus comprising:
   an extraction unit configured to extract a leading edge of a first object at an end of a first page, and a leading edge of a second object at an end on the side facing the first page end, on a second page following the first page;
   an overlapping determination unit configured to determine whether a result of overlapping the leading edge of the first object with the leading edge of the second object satisfies a certain condition;
   a merging unit configured to generate a merged object by using both the first object comprising the leading edge and the second object comprising the leading edge in a case where the overlapping determination unit determined that the result of overlapping satisfies the certain condition;

a reduction unit configured to reduce the merged object so that the merged object fits into one page; and a calculation unit configured to overlap the leading edge of the first object with the leading edge of the second object to calculate the area matching rate based on the overlapping area, wherein the calculation unit vertically and horizontally overlaps the leading edge of the first object with the leading edge of the second object to calculate the area matching rate based on a maximum overlapping area.

2. The document processing apparatus according to claim 1, further comprising:
a condition acceptance unit configured to accept a condition setting from a user.

3. The document processing apparatus according to claim 1, further comprising:
a specification unit configured to analyze the second page to specify the position, size, and range of the second object,
wherein the calculation unit determines whether the leading edge of the first object overlaps with the leading edge of the second object preferentially in the vertical or horizontal direction based on the specified position, size, and range, and superimposes these ends preferentially in the thus determined direction to calculate the area matching rate based on the overlapping area.

4. The document processing apparatus according to claim 1, further comprising:
a determination unit configured to analyze the second page to determine whether the second object is within a specified range of the second page,
wherein, when the determination unit determines that the second object is within the specified range, the calculation unit calculates the area matching rate.

5. The document processing apparatus according to claim 1, wherein the extraction unit comprises:
extracting, when a document is described in the left-to-right description format, a leading edge of the rightmost object on the first page and a leading edge of the leftmost object on the second page; and
extracting, when the document is described in the right-to-left description format, a leading edge of the leftmost object on the first page and a leading edge of the rightmost object on the second page.

6. A document processing method performed by the document processing apparatus, comprising:
extracting a leading edge of a first object at an end of a first page, and a leading edge of a second object at an end on the side facing the first page end, on a second page following the first page;
determining whether a result of overlapping the leading edge of the first object with the leading edge of the second object satisfies a certain condition;
generating a merged object by using both the first object comprising the leading edge and the second object comprising the leading edge in a case where it is determined that the result of overlapping satisfies the certain condition;
reducing the merged object so that the merged object fits into one page; and
calculating, configured to overlap the leading edge of the first object with the leading edge of the second object to calculate the area matching rate based on the overlapping area,
wherein the calculation vertically and horizontally overlaps the leading edge of the first object with the leading edge of the second object to calculate the area matching rate based on a maximum overlapping area.

7. A storage medium storing a program for instructing a computer to perform processing comprising:
extracting a leading edge of a first object at an end of a first page, and a leading edge of a second object at an end on the side facing the first page end, on a second page following the first page;
determining whether a result of overlapping the leading edge of the first object with the leading edge of the second object satisfies a certain condition;
generating a merged object by using both the first object comprising the leading edge and the second object comprising the leading edge in a case where the overlapping is determined that the result of overlapping satisfies the certain condition;
reducing the merged object so that the merged object fits into one page; and
calculating, configured to overlap the leading edge of the first object with the leading edge of the second object to calculate the area matching rate based on the overlapping area,
wherein the calculation vertically and horizontally overlaps the leading edge of the first object with the leading edge of the second object to calculate the area matching rate based on a maximum overlapping area.

\* \* \* \* \*